United States Patent

[11] 3,595,407

[72] Inventors Helmut Muller-Kuhn
 Mulheim Ruhr;
 Klaus Walkhoff, Essen; Uwe Lichtenford, Essen-Werden, all of, Germany
[21] Appl. No. 789,869
[22] Filed Jan. 8, 1969
[45] Patented July 27, 1971
[73] Assignee Fried Krupp Gesellschaft Mit Beschrankter Haftung Essen, Germany
[32] Priority Jan. 8, 1968
[33] Germany
[31] P 15 56 598.7

[54] TRANSLOADING INSTALLATION FOR AIR FREIGHT CONTAINERS
16 Claims, 8 Drawing Figs.
[52] U.S. Cl. .................................................. 214/38 BA,
 214/38 CA, 214/38 D, 214/658, 244/137 R,
 294/67 DB
[51] Int. Cl. ...................................................... B65g 67/00
[50] Field of Search .......................................... 214/38.42,
 38.8, 658; 244/137

[56] References Cited
UNITED STATES PATENTS
1,716,588 6/1929 Kirchner ...................... 214/38 (.42)
2,498,819 2/1950 Noville ........................... 214/38 (.42) X
2,826,319 3/1958 Renner et al. ................ 244/137 X
3,124,209 3/1964 Flipse ........................... 214/38 X

Primary Examiner—Robert G. Sheridan
Attorney—Walter Becker

ABSTRACT: A crane apparatus and movable pallet means are provided for transfer of airfreight containers through upper and lower intermediate storage and sorting places adjoining a stopped aircraft. A bridge platform is adjustably supported to serve for equalization of height differences with respect to the aircraft and intermediate tracks equipped for shifting the containers longitudinally and transversely of symmetrical roller-equipped halves of intermediate storage and sorting places complementary to rows of containers parallel to the longitudinal axis of the aircraft. Pallet means are transported on underside track air cushions to the intermediate storage and sorting place. A U-shaped crane carriage and holding device are provided including gripping means with an open-bottom carrier frame. Rollers are provided to facilitate on-off movement of containers and including the air cushion on an underside of at least one topside roller-equipped track.

INVENTOR.
HELMUT MÜLLER-KÜHN
KLAUS WALKHOFF
UWE LICHTENFORD

By

TRANSLOADING INSTALLATION FOR AIR FREIGHT CONTAINERS

The present invention relates to a transloading installation for airfreight containers. In view of the ever-increasing airfreight traffic, there exists the trend to build freight airplanes with ever-increasing loading capacity, and in the near future there will be available airfreight airplanes with a useful load capacity of 100 tons.

The freight transloading will be based on the application of containers for which two types will primarily be used, namely
  a. the so-called ISO-containers, and
  b. the so-called cargo containers.

The so-called ISO-containers have a width and a height of 8 feet and a length of 10 feet. They are suitable for a type of from-house-to-house traffic inasmuch as they have a width and height which correspond to the optimum truck-loading dimensions and have such a length that four of these containers can be loaded on a truck trailer. There also exist ISO-containers which have a length of 20 feet so that two such containers can be placed on a trailer one behind the other.

The so-called cargo containers are shaped in conformity with the cross section of the lower portion of an airplane fuselage without considering the loading dimensions of trucks. These cargo containers are used primarily for collective goods which are packed at packing stations of the airport or at packing stations likewise located at the airport and run by forwarding companies.

Thus the future airfreight traffic will involve considerable investments. Of these investments the largest will be in the correspondingly large airplanes, the so-called jumbo jets, and also in freight-transloading installations which must be laid out in conformity with most modern requirements incorporating electronic control systems. Therefore, in the interest of economy, it will be necessary that the expensive jumbo or giant airplanes are in use most of the time which means that the stopover time of the airplanes must be reduced to a minimum.

It is, therefore, an object of the present invention so to design the transloading stations that airplanes can be unloaded and reloaded in a minimum of time.

It is another object of this invention so to design the transloading installations that it will be possible to unload and reload a giant airplane for the transport of 33 ISO-containers and 15 cargo containers in approximately 45 minutes.

These and other objects and advantages of the invention will appear more clearly from the following specification in connection with the accompanying drawings, in which.

In order to realize the above-outlined objects, it is suggested in conformity with the present invention so to design a transloading installation for airfreight containers that at least one intermediate storage and sorting place for the containers is provided at an area which serves for parking the respective freight airplane and is in readiness for loading and unloading. This intermediate storage and sorting place is in substantial alignment with the longitudinal extension of the parked airplane. That side of the intermediate or sorting place which is remote from the airplane parking area is equipped with a crane installation for receiving the containers from the airplane and for moving the freight from the airplane to the intermediate or storage place, and vice versa from said place onto the airplane. The containers on the intermediate and sorting or storage place are transported preferably by movable transporting means and the like.

It is intended above all to employ freight airplanes with an upper loading space which extends over the length of the fuselage, and with at least one lower loading space. In such an instance, in conformity with the present invention, two intermediate or sorting places are arranged one above the other. The lower place which is expediently located at the same level as the airport level, i.e. the surface of the airplane parking place, will serve first for the transloading of cargo containers, whereas the upper intermediate storage and sorting place which is located on a story of a corresponding hall is intended for the transloading of the ISO-containers.

Starting with the lower intermediate storage and sorting place, expediently runways or tracks are provided as buffer surfaces for the respective cargo containers on both sides of the airplane parking area, and from these runways or tracks there will branch off additional runways or tracks leading to the lateral loading openings of the lower loading space of the airplane. The upper intermediate storage and sorting place is located approximately at the level of a between deck of the airplane which between deck forms the bottom for the upper loading space. The upper loading space has a loading opening facing toward the upper intermediate storage and sorting place.

According to a further development of the present invention, the upper intermediate storage and sorting place is equipped with intermediate runways or tracks which are approximately flush with the between deck of the airplane and which serve as buffer surfaces for rows of containers ready to be put on the airplane and for rows of containers which are unloaded from the airplane. In order to make up for differences in the level of the between deck of the parked airplane and the intermediate runways or tracks, as such differences may be caused by the loading condition on the between deck of the airplane, there may be employed an adjustable bridge plate. The intermediate tracks or runways are expediently designed for displacing the containers in a longitudinal direction thereof and transverse thereto.

The intermediate storage and sorting places are preferably equipped with two sections symmetrically arranged with regard to the longitudinal axis of the parked airplane. Of these sections, one is intended for the containers to be unloaded from the airplane whereas the other section is intended for the containers to be put into the airplane. Preferably, both sections of the intermediate storage and sorting places are provided with roller-equipped platforms or the like for rows of containers to be arranged parallel to the longitudinal axis of the parked airplane. The said roller-equipped platforms are adapted to displace the containers transverse to the longitudinal axis of the parked airplane. The lower intermediate storage and sorting place may comprise a field facing the crane installation for packing containers and may also comprise a field facing the airplane parking place and being provided with roller-equipped platforms for placing the cargo containers in readiness for loading.

The present invention furthermore comprises a travelling crane installation, especially for a transloading installation handling airfreight containers. This traveling crane is equipped with vertical guiding means located on a frame of the carriage for a holding device for grasping similar load bodies. This holding device, according to the present invention, comprises a frame open at the bottom which frame is adapted from the top to reach over a load body and has the lower ends of its legs provided with gripper means which in a first or release position during the lowering and lifting of the frame pass by the load body, and which in a gripping position engage the load body below the bottom thereof. The vertical guiding means expediently consist of a guiding path fixedly connected to the framework of the carriage and a rail extending in vertical direction through said guiding path, the abovementioned frame being guided in vertical direction on said rail. For purposes of displacing the frame on the vertical guiding means there are preferably provided hydraulic-power-operated devices which are located on the framework of the carriage and extend in upward direction. These power-operated devices include pulleys for tackles which on one hand are connected to the framework and on the other hand to the frame. Expediently, the framework pertaining to the carriage is so journaled that it can be pivoted laterally.

Figure 1:
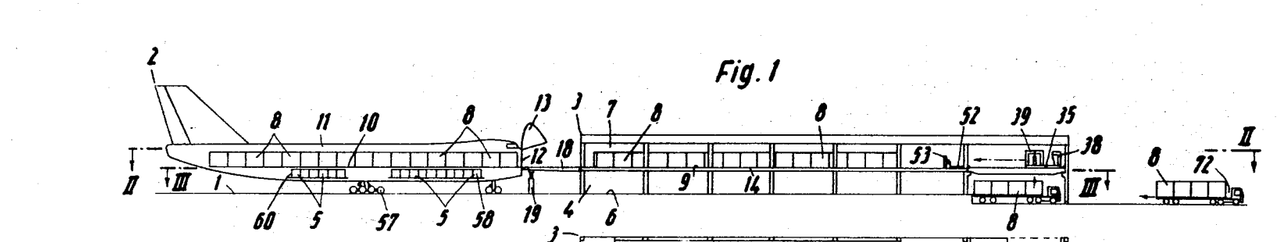
FIG. 1 represents a vertical central longitudinal section through a transloading device according to the present invention.

Referring now to the drawings in detail, FIG. 1 shows a giant airplane 2 parked on an area 1 of the airport level for unloading and loading purposes. The fuselage of the airplane 2 is adapted to receive, for instance, 33 ISO-containers and 15 cargo containers. The nose of the fuselage faces toward a two-story building 3 which in longitudinal direction of the airplane is adjacent to the airplane parking area 1. The building 3 has on its lower story a hall 4 for the transloading of the cargo containers 5. The floor 6 of this hall 4 which forms the intermediate storage and sorting place for the cargo containers 5 is at the level of the airport and thus represents the continuation of the airplane parking area 1. The upper story of the building 3 comprises a hall 7 for the transloading of the ISO-containers 8. The floor 9 of the hall 7 which floor forms the upper intermediate storage and sorting place, has the same height as a between deck 10 provided in the interior of the fuselage of the airplane 2 and forms the floor of an upper loading space 11 extending over the length of the fuselage.

The upper loading space 11 is intended for receiving 33 ISO-containers 8 which are arranged in two rows closely adjacent to each other. This storage space 11 has a loading opening 12 at its front end. Said loading opening can be exposed, as shown in FIG. 1, by folding the fuselage nose 13 upwardly. In order to facilitate the displacement of the ISO-containers 8 within the upper loading space 11 and in the longitudinal direction thereof, the between deck 10 is provided with two adjacent tracks or runways formed by rollers arranged behind each other.

The hall 7 comprises two pairs of similar runways or tracks 14 and 15 which are arranged symmetrically with regard to the extended axis 16 of the parked airplane 2. On said runways 14, as buffer surfaces, there may be placed in readiness two rows of 16 ISO-containers each which are located close to each other for the loading of the airplane 2. The two runways or tracks 15 as buffer surfaces are adapted to receive two rows of closely spaced ISO-containers 8 which are moved out of the upper loading space 11 of the airplane 2. The two pairs of runways or tracks 14 and 15 unite at that end which faces the airplane 2 and merge to form a track 17 which is located on a bridge platform 18 and tapers up to the connection with the between deck 10. The bridge platform 18 is connected to the floor 9 of the building 3 by means of hinges whereas the opposite end of said bridge platform 18 rests on supports 19 which are adjustable as to height. By adjusting these supports, the bridge platform 18 is adapted to be tilted upwardly and downwardly by about 2° with regard to the horizontal plane in order to make up for differences in the level caused by different loading conditions of the airplane.

At both sides of the tracks or runways 14, 15 there are provided a plurality of longitudinally extending roller-equipped platforms 20, 21 for receiving ISO-containers 8, said platforms being arranged parallel to the extended axis 16 of the airplane. Two of such platforms 20, 21 each are located closely adjacent to each other on both sides of a row of supporting pillars 22, and two additional roller-equipped platforms 20, 21 extend alongside the two side walls of the hall 3. Between each two platforms 20, 21 and between the intermediate tracks or runways 14, 15 and the next roller-equipped beds or platforms 20, 21 the floor 9 is left free so that wide aisles 23, 24 and 25, 26 are formed. Also between the end faces of said platforms 20, 21 and the end faces of the building 3 there are provided wide aisles 27, 28; 29, 30. The platforms 20, 21 have roller trains or roller tracks which permit a displacement of the containers thereon in a direction transverse to the extended airplane axis 16. Alongside the transverse side of the building 3 which transverse side is facing away from the airplane parking place 1 there is provided a crane installation. This crane installation has two traveling crane rails 31, 32 which are located somewhat lower than the top side of the floor 9 along the transverse side of the building 3 and are spaced from said transverse side. Movably arranged on rails 31, 32 are two crane bridges the beams 33 of which form hollow boxes and are spaced from each other to a considerable extent. The said beams 33 are parallel to the extended axis 16 of the parked airplane 2. The head beam of the crane bridges is designated with the reference numeral 34. On each crane bridge 33, 34 there is displaceably provided a carriage the framework 35 of which is U-shaped, the open side of the U facing the hall 7. On the frame 35 of the carriage there is provided a U-shaped framework 36 the U opening of which likewise faces the hall 7. The said framework 36 is mounted on the carriage frame 35 in such a way that it can be tilted to a limited extent about a horizontal axis 37 in the center of the crosshead of the carriage frame 35. Within the area of the axis 37, a crane operator's cab 38 is so arranged on the framework 36 that the operator faces the hall 7.

Figure 4:
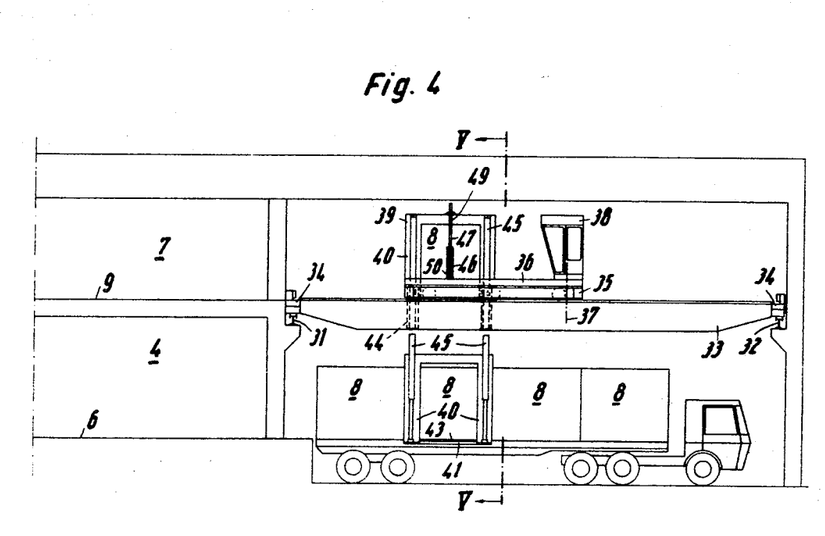
FIG. 4 shows in section the crane installation illustrated in FIG. 1, but on a larger scale than in FIG. 1.
Figure 5:
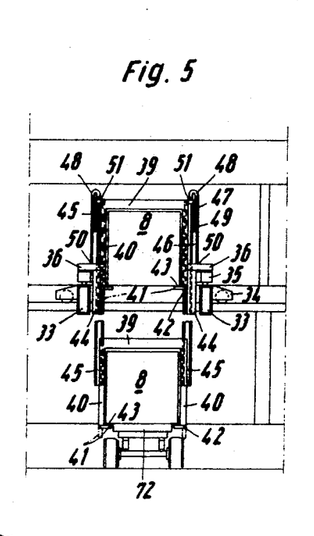
FIG. 5 is a section taken along the line V-V of FIG. 4.
Figure 6:
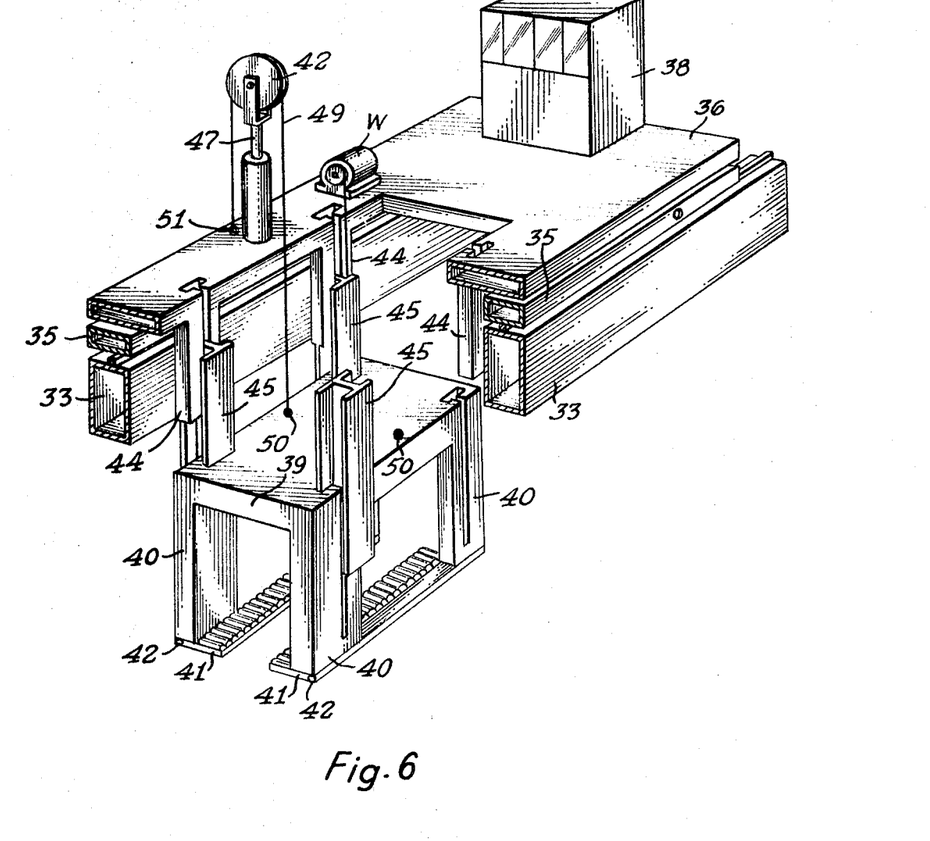
FIG. 6 is a perspective view of a transloading device according to the present invention.
Figure 7:
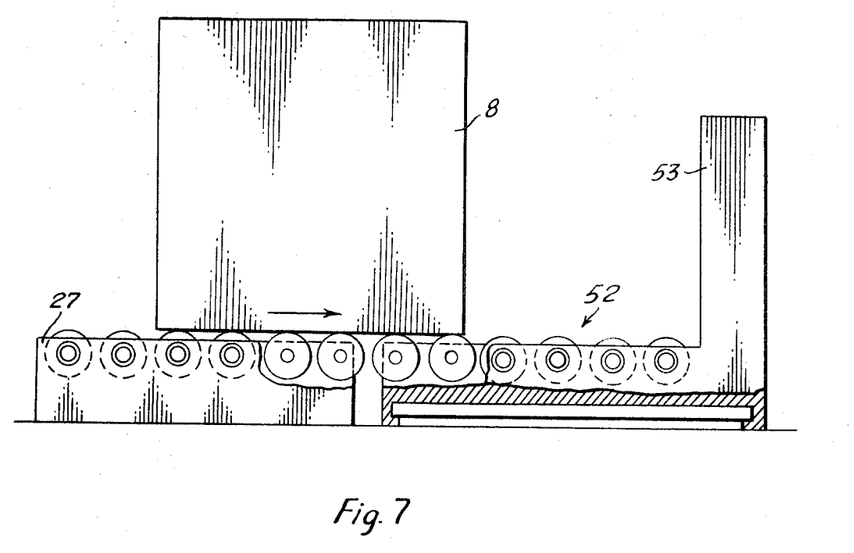
FIG. 7 is a partially sectioned elevational view of roller beds used with the device according to the present invention.
Figure 8:
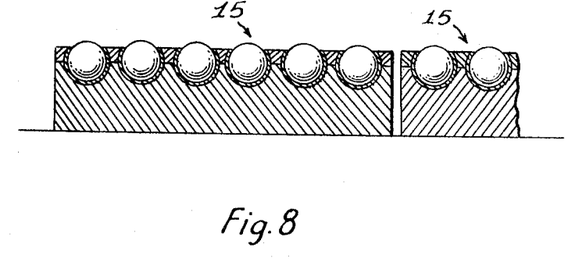
FIG. 8 is an enlarged view of roller track means used with a device according to the present invention.

For purposes of grasping the container 8, each carriage is provided with a U-shaped supporting frame 39 which is open at the bottom and which is adapted to be moved in vertical direction between the legs of the U-shaped framework 36, the legs of the U-shaped carriage frame 35 and the beams 33 of the crane bridge. Each supporting frame 39 has four cornerposts 40. Each two posts 40 form a gate or portal into the opening of which fits the profile of an ISO-container 8 as shown in FIG. 5. Each two cornerposts 40 which are located on a longitudinal side of the framework 36 are offset in the driving direction of the carriage to such an extent with regard to each other that the spacing between their end faces approximately equals the length of an ISO-container 8 (see FIG. 4).

At the lower ends of each two cornerposts 40 on one side of the framework 36 there is mounted in joints 42 a supporting rail 41, said joints 42 having a common pivot axis parallel to the driving direction of the carriage. The supporting rails 41 serve only as gripper means for grasping the container 8. To this end they may be moved by remote control by the operator in the cab 38 into the gripping position shown in FIG. 5 and may be locked in this position in which they are adapted to engage the bottom of a container 8. In the gate of the supporting frame 39 in the area of its lower lateral edges, the supporting rails may from this gripping position be tilted into a release position in which, as indicated in FIG. 5 by dot-dash lines, they will hang from the joints 42 in downward direction so as to release the container 8 downwardly. The supporting rails 41 extend, as will be seen from the lower portion of FIG. 4, between two cornerposts 40 over the length of an ISO-container 8. The top side of said supporting rails 41 is equipped with rollers 43 the axes of which are located transverse to the driving direction of the carriage, in other words parallel to the rails 31, 32.

The supporting frame 39 is along the four cornerposts 40 vertically displaceably guided within the area of that portion of the framework 36 which faces the hall 7. The said supporting frame 39 is guided in such a way that it can not be moved relative to the framework in horizontal direction which means neither in the driving direction of the carriage nor transverse thereto. To this end, the beams of the U-shaped framework 36 have on the inside of said beams rigidly connected thereto four stakes 44. These stakes extend from the beams of the U-shaped framework 36 in vertical direction downwardly and in the intermediate position of the framework 36 are spaced from the beams of the carriage frame 35 and from the beams 33 of the crane bridge in such a way that they will permit the above-mentioned limited lateral tilting of the framework 36 relative to the carriage frame 35. The stakes 44 and the beams of the U-shaped framework 36 have vertical T-shaped slots which are open toward the insides and in which are guided I-beams 45 with their respective profile portion in upward and downward direction. By means of the other profile section, each I-beam 45 engages corresponding slots having a T-shaped profile, said slots being provided in the cornerposts 40. In this way, the I-beams 45 are displaceable relative to the stakes 44, and the cornerposts 40 are displaceable relative to the I-beams 45 in vertical direction but are guided so that they are not displaceable in horizontal direction.

For purposes of lifting and lowering the thus-guided supporting beams 39, there are provided two hydraulic power devices the cylinders 46 of which are mounted on one beam each of the U-shaped framework 36 in the center between two cornerposts 40 while extending in vertical direction. The upwardly extending ends of the pertaining piston rods 47 have journaled thereon deviating rollers 48. A cable or the like 49 passes over each deviating roller 48. One end of said cable is at a point 50 connected to the framework 38 while the other end of said cable is connected at point 51 to the upper side of the supporting frame 39. Furthermore, there are provided means (not shown) by which the I-beams 45 may in said stakes 44b moved downwardly and upwardly.

Figure 2:
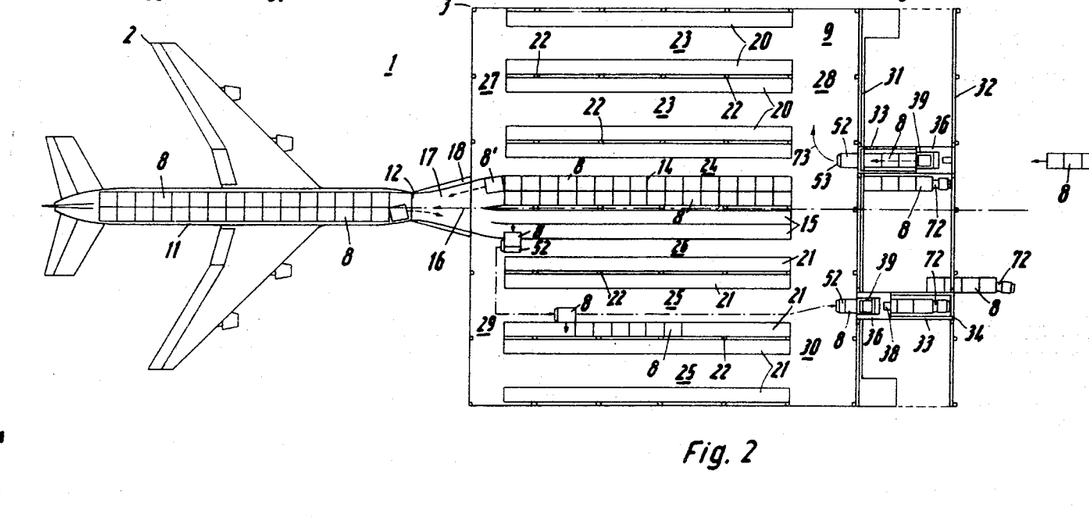
FIG. 2 is a section taken along the line II-II of FIG. 1.
Figure 3:
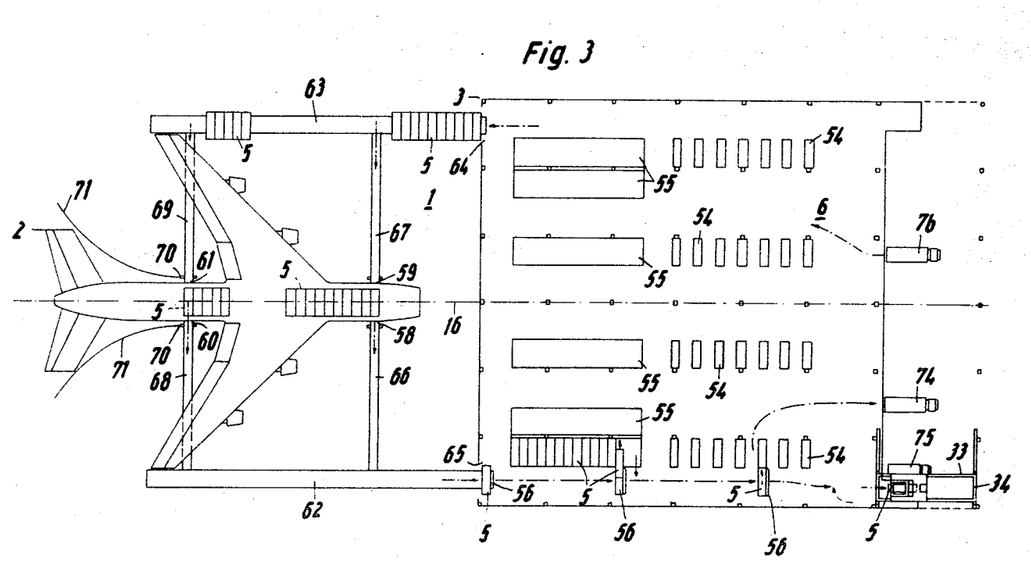
FIG. 3 represents a section taken along the line III-III of FIG. 1.

For purposes of horizontally moving the ISO-containers 8 which by means of the crane installation are lifted up to the level of the floor 9 of hall 7, there are provided pallets 52 indicated in FIGS. 1 and 2. These pallets 52 have a base surface substantially equaling the size of the bottom of an ISO-container 8 and rest on the floor 9 of hall 7, preferably by means of an air cushion which makes possible a very easy displacement of the pallets under load. Such air cushion is enclosed between the pallet and the floor by marginal strips or rails mounted on the bottom side of the pallet, said strips or rails sliding on the floor. The air pressure in the air cushion is produced and maintained by means not shown on the pallet. For purposes of guiding the pallets, the latter are additionally provided with a steering roller device likewise not illustrated. This steering device is controlled by an operator's stand 33 which is located at one end face of the pallet. On the top side of each pallet there is a roller table which permits an easy displacement of the ISO-container 8 in the direction toward the operator's stand 53 and away from the latter. The roller bed supports the container at such a level above the floor 9 that its bottom side is at the level with the top side of the roller beds 21, 22, of the intermediate runways 14, 15 and of the supporting surface formed by the rollers 43 of the supporting frame 39, when said supporting frame occupies its uppermost position. Consequently, the containers 8 can be moved from the pallet 52 to the roller beds 20, 21, the intermediate runways 14, 15 and the rollers 43 of the supporting frame 39 in its uppermost position and inversely from there to the plates at the same level which means without a lowering or lifting.

That major portion of the hall 4 which pertains to the lower story of the building 3 and faces the crane is intended for the packing of the cargo containers 5. To this end, there are provided four rows of packing places 54 which are parallel to the axis 16 of the parked airplane. Each of said packing places has a ground surface which extends transverse to the axis 16 of the parked airplane and serves for receiving a cargo container 5. The runway for the vehicles which bring in the cargo containers is, as shown in FIG. 1, located lower than the level of the floor 6 of hall 4 by the average platform height of the vehicles. In that part of the hall 4 which faces the airplane parking area 1 there are provided a plurality of longitudinally extending roller beds 55 with intermediate storage and sorting places for the cargo containers, said roller beds being parallel to the longitudinal axis 16 of the parked airplane. The roller beds have roller tables on which the cargo containers 5 can be displaced transverse to the axis 16 of the parked airplane.

Between the packing places 54 and the beds 55 and also between the latter and the longitudinal and transverse sides of the hall 4 there are left free wide surfaces of the floor 6 on which the cargo containers can be moved by means of pallets 56. These pallets are basically designed in the same manner as the pallets 52 in hall 7 but are as to their dimensions shaped in conformity with the bottom surfaces of the cargo containers 5.

Below the between deck 10 of the airplane 2 there are provided two loading spaces for the cargo containers 5, one of said loading places being located in front and the other one being located behind the central carriage 57 of the airplane.

Each of these loading spaces has on each side of the fuselage a loading opening 58, 59, 60 and 61. For purposes of moving the cargo containers 5 to the loading spaces and moving the cargo containers away from said loading spaces, on both lateral marginal areas of the airplane parking place 1 there are provided two runways 62, 63 which serve as buffer surfaces and are parallel to the longitudinal axis 16 of the parked airplane. These runways 62, 63 start at the gates 64, 65 in that transverse wall of the building 3 which faces the parking place 1. Adjacent to said runways 62, 63 and at a right angle to the axis 16 of the parked airplane there are provided conveyors 66, 67, 68, 69 which ascend toward the loading openings 58, 59, 60, 61. The conveyors 68, 69 which face away from the building 3 are adapted by means of a carriage 70 at that end which faces the fuselage to be turned in such a way in conformity with an arched rail 71 that they will not interfere with the movement of the airplane 2 on the parking place 1 to the illustrated position and away therefrom.

The transloading of the ISO-containers and the cargo containers is with the described installation effected in the following manner.

The ISO-containers 8 to be transported by the airplane are moved by trucks, for instance trailer trucks 72, to the crane installation while, for instance, four containers 8 are located on the loading surface of the trailer truck one behind the other. A vehicle loaded in this manner is, while backing up into the area, adapted to be covered by traveler cranes moved so that the containers 8 are aligned as far as possible with the axis 16 of the airplane 2. Preferably, the central portion of the area covered by the traveling cranes amounts to an area for instance for four vehicles 72 loaded with ISO-containers 8 and adapted to drive into said area rearwardly adjacent to each other, whereas the adjacent area at both sides below the crane installation is intended for the vehicles which bring in or take out the piece goods for the cargo containers 5.

One of the traveling cranes 33, 34 is moved over the moved-in trailer trucks, and and the carriage 35 of the crane is, as shown in FIG. 2, moved into a position in which the supporting frame 39 is located above that container 8 which is farthest from the hall 7 after the other three containers have already been lifted off the vehicle. If the trailer truck is not precisely parallel to the longitudinal axis 16 of the airplane, the U-shaped framework 36 is pivoted in such a way that its beams will be parallel to the longitudinal axis 16 of the airplane and consequently when lowering the supporting frame 39 the cornerposts 40 of the latter will with the necessary play be moved downwardly to both sides adjacent the container 8. The lowering of the supporting frame 39 has, as shown in the lower portion of FIG. 5, inherent thereto a downward movement of the I-beam 45. The supporting rails 41 will in these circumstances occupy the releasing position according to the dot-dash line shown in FIG. 5.

Thereupon, the rails 41 are by nonillustrated means which are remote-controlled from the crane operator's cab 38 moved into gripping position in which by rollers 43 on both sides of the platform of the vehicle 72 they will engage the bottom of the container 8 from below. In this position they are locked. Thereafter, the supporting frame 39 with the container 8 is by means of the hydraulic power devices 46, 47 lifted into the position shown in FIG. 5. At the same time, the I-beams 45 are displaced upwardly to such an extent that they will not protrude rearwardly with regard to the beams 33 of the crane carriage.

Thereupon, the carriage 35 of the crane is moved to that end of hall 7 which faces the end of the crane bridge. The container is then moved onto a pallet 52 which is placed in readiness at the marginal area of the floor 9, if desired after the framework 36 has been aligned precisely parallel to the axis 16 of the parked airplane. This movement of the container onto the pallet 52 is facilitated by the rollers 43 of the supporting rails 41. The pallet 52 is thereupon in conformity with the curved arrow 73 of FIG. 2 moved to a certain place on one of the roller beds 20 which are located in hall 7 on the right-hand side of the floor 9 (when looking from the crane toward the airplane). In this way many ISO-containers 8 moved by trucks to the said area can be placed upon the roller beds 20 so that they are sorted in conformity with their respective places of destination.

As many containers as can be loaded into the upper loading space 11 of the airplane are placed into readiness on the central runway 14. This is again effected by means of pallets 52. The said containers are placed on the runway 14 in two rows of for instance 16 containers per row and in such a way that they are located closely adjacent to each other while an additional container 8′ is moved onto that end of the runway 14 which leads to the runway 17.

At the same time, the other central runway 15 is kept free. When the loaded airplane 2 is parked on the area 1, and when the loading hatch 12 is opened, first one of the two rows of containers 8 in the upper loading space 11 is moved over the runway 17 onto one-half of the central runway 15. Thereupon, the containers which remain in the loading space 11 will follow and are moved in a row onto the other half of the central runway 15. After this has been accomplished, one after another the two rows of containers placed in readiness and located on the central runway 14 are moved into the upper loading space 11 of the airplane. This unloading and loading of the airplane can be effected in a minimum of time because the central runways 14 and 15 serve as buffer surfaces inasmuch as the runway 15 is immediately ready for receiving all of the containers 8 from the loading chamber 11, and the runway 14 holds in readiness the respective number of containers in loading sequence, and because furthermore the moving of the containers into and out of the loading space 11 is effected on practically the same level, in other words, not by lifting and lowering movements.

The ISO-containers 8 moved onto the central runway 15 are subsequently thereto distributed over those roller beds 21 which are located on the left half of hall 7 (when looking from the crane toward the parking place 1). The containers 8 can then be sorted in conformity with the further transport to the various places of destination.

The lower right-hand portion of FIG. 2 shows how a container 8 which by means of a pallet 52 has been moved from one of the roller beds 21 and has been moved to that portion of the marginal area of floor 9 which faces the crane, is moved from the pallet into the supporting frame 39 of the carriage of one of the two correspondingly advanced traveler cranes. By means of this crane, the container is deposited upon one of the trailer trucks below said crane. This trailer truck is intended to move to the respective place of destination after it has been loaded with a total of four ISO-containers. This vehicle may be the same vehicle which previously has moved a container to the crane installation. Also when depositing the container onto the vehicle platform, the U-shaped framework 36 may by laterally pivoting be so adjusted that also when the vehicle is not precisely parallel to the axis 16 of the airplane, the container will be placed in the proper position on the vehicle. At any rate, the crane operator will be able from his cab 38 to observe all movements whereby the control of the movements of the containers in horizontal as well as in vertical direction will be facilitated.

In this connection it is important that the traveling cranes, even when under the load of a container, can be greatly accelerated and retarded inasmuch as the telescopic guiding means of the supporting frames 39 will prevent the load from carrying out a pendulum movement relative to the framework 36 of the carriages in contrast to the situation when the load is suspended on a cable.

The fact that the ISO-containers received from the crane installation are moved to the right-hand half of the loading space 7, and all ISO-containers conveyed to the crane installation arrive from the left-hand side of hall 7 will bring about that the one-way traffic flow will take place in such a manner that it can easily be observed and no overlapping will occur. In this connection it is favorable with regard to the full use of the available area that by means of the pallets 52 and the central runways 14, 15 the containers will, aside from the pivoting movements (arrow 73) when moving from hall 7 to the crane installation and vice versa, be move exclusively parallel to the longitudinal axis of the airplane 2 or at a right angle thereto.

During the loading and unloading of the airplane with ISO-containers 8, the cargo containers 5 in the lower loading spaces will be removed from the airplane into the lower hall 4 and immediately subsequently thereto, the same number of cargo containers is moved into the lower loading spaces. The transfer of the cargo containers 5 from the airplane into the hall 4 is effected one after the other through the loading hatches 58 and 60 by means of conveyor belts 66 and 68 and the runway 62. Each container 5 will at the end of the runway 52 be received by a pallet 56 and will be moved either to a certain place on one of the roller beds 55 in conformity with a certain sorting, or the containers 5 are transferred to one-half of the packing places 54 to be unpacked. The goods which are there unpacked from the containers 5 are by means of any suitable transport vehicle or conveyor moved to the trucks 74 which are located below the crane installation.

It is also possible to transport the emptied containers 5 or the not-yet-unpacked containers 5 by means of trucks 75. In this instance the depositing of the container 5 by means of a pallet 56 to the marginal area of the floor 6 is effected by the traveling cranes. As soon as the lower loading spaces of the airplane have been emptied, they are loaded by means of conveyor belts 67 and 69 with new cargo containers 5 which had been previously placed in readiness on the runway 63. The sorting of these containers in conformity with their respective places of destination has previously been carried out while making use of one-half of the roller beds 55. Also the containers or at least some of them were previously packed on the packing places in the respective half of hall 4. The goods to be packed are moved to the packing place, for instance, by means of trucks 76 from which the goods are moved to the packing places 54 by any convenient transporting means. It is, of course, also possible that packed cargo containers advanced by trucks are by means of one of the travelling cranes deposited upon a pallet 56 and by the latter moved to the respective roller beds 55.

Also in hall 4, the goods and containers moved in from the side of the crane installation are moved only over the right half of the floor 6 (when looking from the crane to the airplane), whereas the containers and goods moving out of the hall 4 to the transport trucks 74, 75 are exclusively moved over the left half of the floor 6. Also in this instance a traffic flow will be obtained which can be easily observed and will not overlap. This is likewise effected on the same level.

The unloading of the cargo containers 5 from the lower loading spaces of the airplane 2 and the moving in of new cargo containers into said loading spaces may be carried out in the described manner and at least in the same short period of time as the unloading of the ISO-containers 8 from the upper loading space 11 and the loading of new ISO-containers into said space for which loading operations for instance only 45 minutes are available. Since the number of the cargo containers 5 is considerably less than the number of the ISO-containers, the sorting and stocking of the cargo containers requires a correspondingly smaller floor space of the hall 4 than is required in hall 7 for the ISO-containers, since, however, the hall 4 has the same floor space as the upper hall 7, a greater part of the floor 6 of hall 4 can be used for the packing of the cargo containers 5.

The building 3 in the longitudinal direction of the longitudinal axis 16 of the parked airplane may be longer or shorter than illustrated in conformity with the required floor space.

It is, of course, to be understood that the present invention is, by no means, limited to the particular showing in the drawings but also comprises modifications within the scope of the appended claims.

What we claim is:

1. A transloading installation for air freight containers, comprising: a building having at least an intermediate storage and sorting place for load containers readily available in an area for freight material being transferred to and from an aircraft which has upper and lower loading spaces and is stopped with its nose toward and adjacent to the front of the building, a crane apparatus adapted for longitudinal alignment with the stopped aircraft and movable transversely away from its aligned position and laterally of the intermediate storage and sorting place, runway means serving as conveying and holding surfaces for containers and extending outwardly from the intermediate storage and sorting place, additional runways branching off from said runway means and terminating at lateral loading openings to the lower loading space of the aircraft, bridge means adapted to connect the upper loading space with the intermediate storage and sorting place, and movable pallet means which receive containers transferred by said crane apparatus from delivery vehicles for forwarding the containers to the intermediate storage and sorting place and for removal of arriving containers by the crane apparatus from the intermediate storage and sorting place to delivery vehicles.

2. A transloading installation according to claim 1, in which the intermediate storage and sorting place comprises upper and lower places one above the other, and the runway means lead from the lower storage and sorting place, the runway means extending as conveying surfaces for containers on both sides of the stopped aircraft, the branching runways extending from said runway means to endings thereof at lateral loading openings of said lower loading space, and a between deck formed at the height of the bottom of the upper loading space at the level of said upper intermediate storage and sorting place, said upper loading space of said aircraft having a loading opening toward said upper intermediate storage and sorting place.

3. A transloading installation according to claim 2, in which intermediate tracks extend from said upper intermediate storage and sorting place to said between deck of the stopped aircraft, said tracks serving as buffer surfaces for rows of containers ready for loading into the aircraft and for receiving containers from the aircraft.

4. A transloading installation according to claim 3, in which a bridge platform connecting said upper intermediate storage and sorting place and said upper loading place is adjustably supported to serve for equalization of height differences with respect to said between deck of the aircraft and said intermediate tracks according to differing loading conditions of the stopped aircraft.

5. A transloading installation according to claim 3, in which said intermediate tracks are equipped for shifting the containers both longitudinally and transversely thereof.

6. A transloading installation according to claim 2, in which each of said upper and lower intermediate storage and sorting places has two halves symmetrical to the longitudinal axis of the stopped aircraft, one of which is designated for the containers being removed from the aircraft and the other of which is designated for the containers entering the aircraft.

7. A transloading installation according to claim 6, in which roller-equipped beds are provided upon both halves of said storage and sorting places and are arranged to hold rows of containers parallel to the longitudinal axis of the aircraft.

8. A transloading installation according to claim 7, in which said roller-equipped beds are adapted for shifting the containers transversely to the longitudinal axis of the stopped aircraft.

9. A transloading installation according to claim 2, in which said lower storage and sorting place comprises a section adjoining said crane apparatus adapted for packing of containers and a section adjoining the stopped aircraft location with said roller-equipped beds adapted for container preparation and adapted for receipt of containers forwarded out of the aircraft.

10. A transloading installation for airfreight containers, comprising: an intermediate storage and sorting place for containers for freight being transported by aircraft, a traveling crane apparatus which is adapted to be aligned longitudinally with an aircraft stopped with its nose toward and adjacent to the intermediate storage and sorting place and which is adapted to move transversely from its aligned position, said crane apparatus having a crane carriage including a frame with vertical guides, a holding device for grasping similar load containers which is slidable on said vertical guides on the frame of the crane carriage, said holding device comprising an open-bottom U-shaped carrier frame guided in vertical movement and formed to engage over one load container at a time, and having holding means supported on its lower end which selectively in releasing condition move past the load container upon lowering and raising of said carrier frame and in a holding condition extend under the bottom of the load container, and movable pallet means serving to receive containers from said crane apparatus which are removed from delivery vehicles for forwarding the containers to the intermediate storage and sorting place and likewise for removal of arriving containers from the intermediate storage and sorting place to delivery vehicles.

11. A transloading installation according to claim 10, in which said perpendicular guides comprise a guide track means securely seated on said frame of said crane carriage and a beam guided thereby in perpendicular direction and along which said carrier frame is guided in vertical direction.

12. A transloading installation according to claim 10, in which for shifting said carrier frame along said perpendicular guides upon said frame of the carriage, fluid-operated power devices are provided extending upwardly with rollers for cable towing which are secured on one side to said carriage frame and on another side to said carrier frame.

13. A transloading installation according to claim 10, in which said carriage frame is journaled laterally swingable on said crane carriage.

14. A transloading installation according to claim 10, in which said frame and said crane carriage are open at opposite ends so that when the load container is projected out over the crane traveling path, there is permitted travel of the load container out of the carrier frame in a direction toward the end of said carriage-traveling path.

15. A transloading installation according to claim 13, in which a crane-guiding stand is provided at the other end of the carriage-traveling path adjoining the side of said frame.

16. A transloading installation according to claim 10, in which said holding means are formed as supporting rails of substantially the length of the load container and have rollers on topside thereof to facilitate movement of the load container out of said carrier frame and also movement into the same.